United States Patent [19]
Zentner

[11] 3,968,533
[45] July 13, 1976

[54] FASTENER MANUFACTURING APPARATUS
[75] Inventor: Richard L. Reynolds, Palos Verdes, Calif.
[73] Assignee: Litton Fastening Systems, Lakewood, Calif.
[22] Filed: June 17, 1974
[21] Appl. No.: 479,650

Related U.S. Application Data
[63] Continuation-in-part of Ser. No. 353,449, April 23, 1973, Pat. No. 3,894,570.

[52] U.S. Cl. .......................................... 10/2; 10/9; 10/10 P; 219/76; 219/77; 219/87; 118/624
[51] Int. Cl.² .................. B21H 3/00; B23G 9/00; B23K 9/04
[58] Field of Search ............... 10/10 R, 10 P, 27 R, 10/2, 9; 118/620, 621, 624; 151/7, 14 R, 14.5, 22; 219/76, 77, 85, 87; 427/37, 49, 284, 287, 425

[56] References Cited
UNITED STATES PATENTS

| 1,327,101 | 1/1920 | Kellogg | 219/77 |
|---|---|---|---|
| 3,033,705 | 5/1962 | Hanink et al. | 427/425 |
| 3,098,150 | 7/1963 | Inoue | 219/76 |
| 3,129,504 | 4/1964 | Ivan et al. | 219/76 |
| 3,415,970 | 12/1968 | Cline | 219/76 |
| 3,416,492 | 12/1968 | Greenleaf | 118/620 |
| 3,452,714 | 7/1969 | Burke et al. | 118/620 |
| 3,524,956 | 8/1970 | Rocklin | 219/76 |
| 3,552,467 | 1/1971 | Bergere | 151/14 R |
| 3,614,373 | 10/1971 | Skilling | 219/76 X |
| 3,619,545 | 11/1971 | Borden | 219/77 |
| 3,643,722 | 2/1972 | Oestereicher | 151/22 |
| 3,743,815 | 7/1973 | Woods | 219/76 |
| 3,763,343 | 10/1973 | Rocklin | 2109/76 |
| 3,831,213 | 8/1974 | Bedi | 10/10 P |

FOREIGN PATENTS OR APPLICATIONS
295,354  5/1972  U.S.S.R. .................. 219/76

Primary Examiner—C. W. Lanham
Assistant Examiner—E. M. Combs
Attorney, Agent, or Firm—Alan C. Rose; Thomas A. Turner, Jr.

[57] ABSTRACT

A threaded fastener of the self-tapping type is described having the conventional head, shank, and pilot end. The shank includes a helically wound thread member impregnated with a carbide or other, harder substance than the metal from which the fastener is made. A thread-cutting fastener, having its pilot tip end impregnated is also described. A thread-rolling machine with a unique impregnating electrode is disclosed. The electrode is shown to engage the fastener selectively during the thread-rolling operation itself.

8 Claims, 10 Drawing Figures

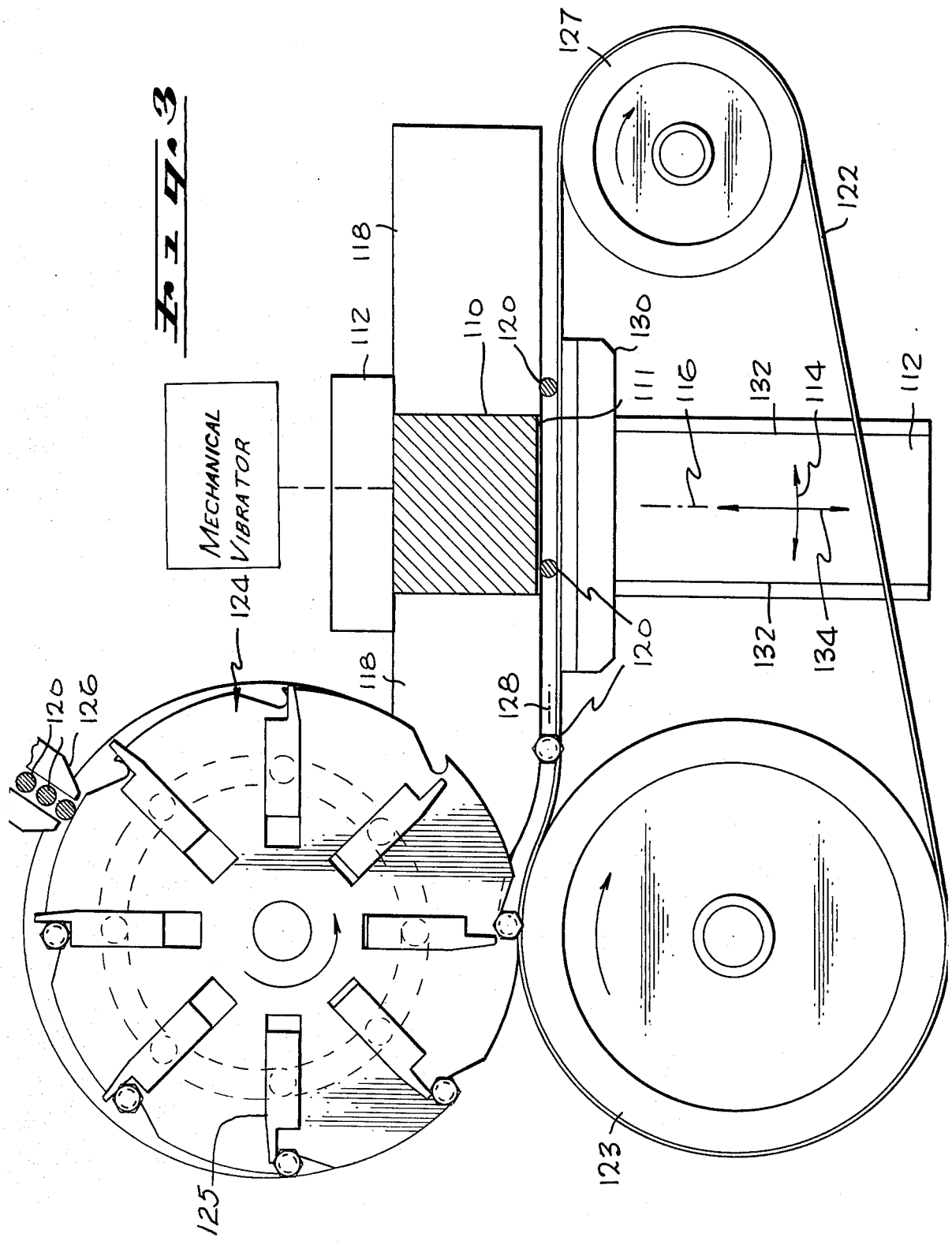

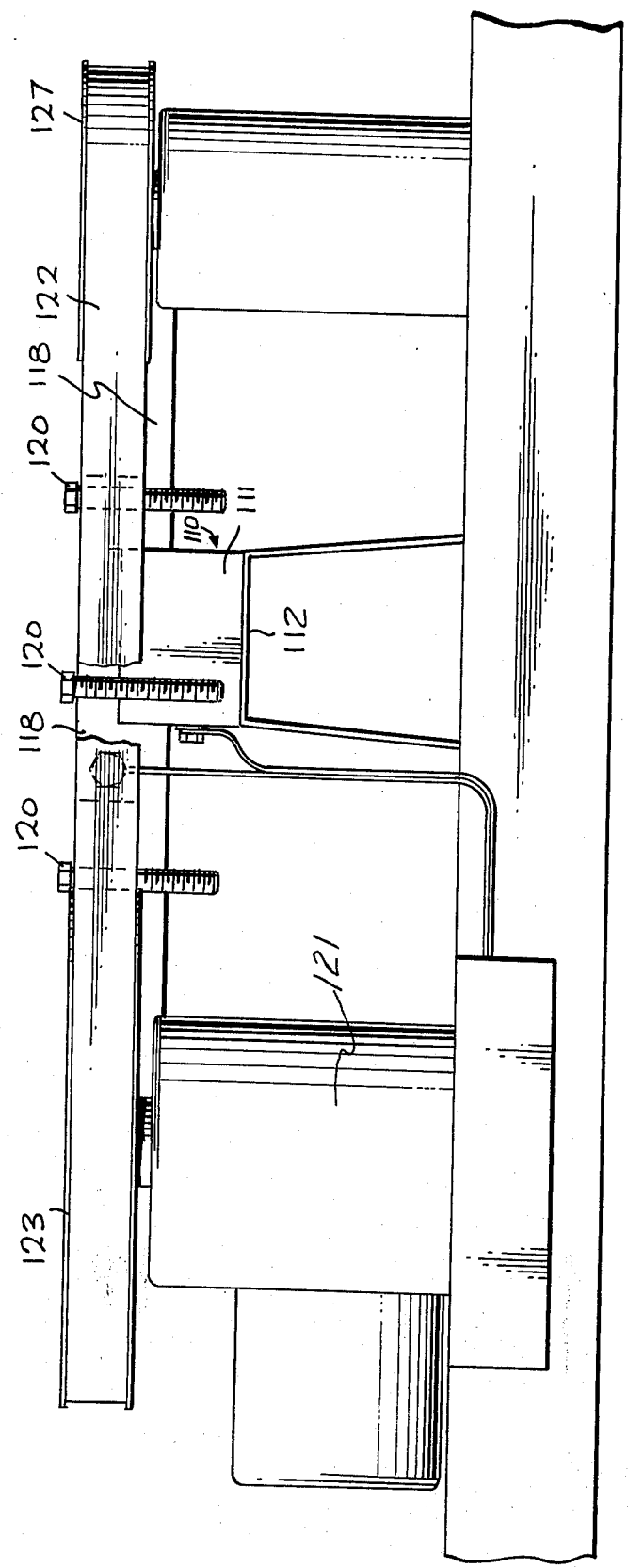

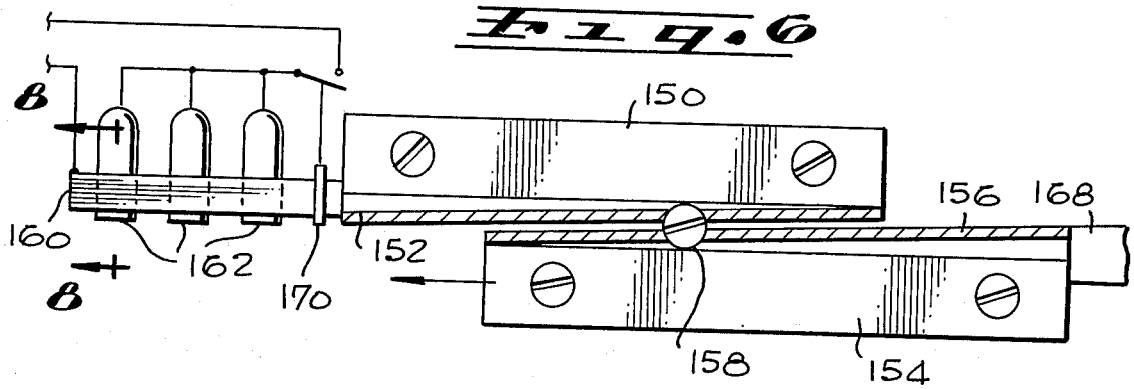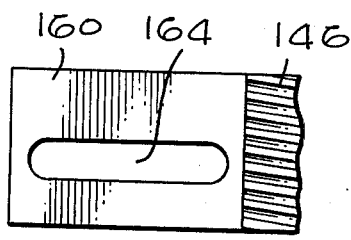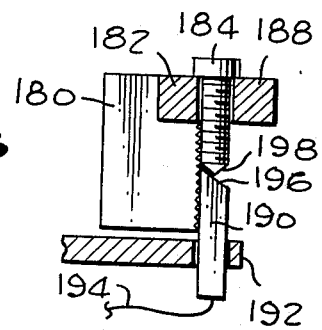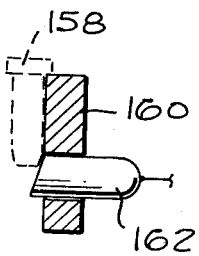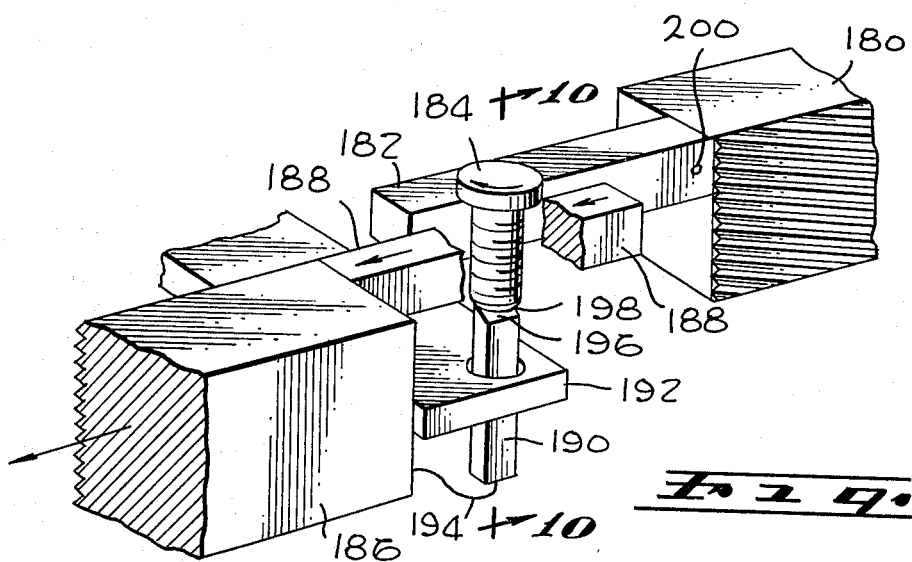

FASTENER MANUFACTURING APPARATUS

This application is a continuation-in-part application derivative from application Ser. No. 353,449 filed Apr. 23, 1973 now U.S. Pat. No. 3,894,570 by the same applicant herein, Richard L. Reynolds. All rights of priority based on the said application Ser. No. 353,449 are hereby asserted and claimed.

BACKGROUND OF THE DISCLOSURE

The fastener manufacturing industry has had the problem of making metal fasteners possessing at once characteristics of ductility and toughness, yet having relative thread hardness.

By being ductile or tough, a metal is considered herein as being pliant yet strong, as having the quality of bending or twisting without tearing or breaking. Antonymously, "hardness" is used herein to characterize increasing susceptibility to breaking, or brittleness, in addition to resistance to penetration. In the art or trade, it is customary to use the "Rockwell" hardness testing devices. Using such devices, a metal is penetrated by a substance of known hardness, such as a diamond, with a predetermined force. The depth of penetration gives a relative indication of hardness. A number is assigned directly relative to the penetration depth. The results of such a device are ordinarily given on the "Rockwell" scales designated A, B and C. The higher the number assigned as a result of such a test, the harder the metal. Thus, a metal having a hardness corresponding to a reading of $C = 30$ or less on the Rockwell scale would be of the order as is normally considered ductile and is used in the manufacture of relatively tough, ductile fasteners.

A fastener made from such tough, ductile material generally fails as a self-tapping screw. A self-tapping screw is one which forms its own mating threads or reciprocal grooves in a drilled hole in metal or in a hole into which the fastener is being inserted. Failure occurs when the ductile or tough thread on the fastener collapses within the unthreaded hole.

Various methods are presently used to make the fastener harder on its outside surface while maintaining toughness. The most common, presently used process is a three-step process. First, the fastener is heat treated to approximately 1700° F or more. The fastener is then in a second step case hardened. In this second step, the fastener's surface is thoroughly cleaned, heated to approximately 1250° F to 1300° F and placed into a carbon rich atmosphere. In such an environment, the metal has a propensity to attract the carbon. The usual result is an approximately 0.004 inch to 0.006 inch carbon layer deposited upon the fastener's surface. The third procedural step is entitled induction heat treating. In this step, the pilot end of the threaded fastener is placed in a rapidly changing inductance field. The iron in the metal has its magnetic field changed by each hysteresis cycle, and thus is heated very rapidly to red hot temperatures. Upon cooling, the molecular structure at least of approximately 0.06 inch of the exposed surface of the pilot end is changed. The result of such treatments, unfortunately, hardens the fastener and makes it more brittle. In fact, such an induction heating procedure has made test fasteners possess a hardness on the order of $C = 45$ and higher on the aforementioned Rockwell scale.

To manufacture these relatively hard fasteners in the currently known manner, a premium alloy steel containing an additional metal alloy ingredient is required. Such additional metal could be manganese, chromium, nickel and the like except carbon. These alloys are expensive. Furthermore, the three-step procedure outlined above requires careful attention and handling. Prior to case hardening, for example, the fasteners and the thread root area between the threads must be thoroughly cleaned of the lubricating oils and other grit of manufacture so that the carbon will evenly and finely deposit upon the surface of the fastener. The carbon rich atmosphere must be precise and requires careful attention.

Additionally, the induction-heating step requires meticulous positioning of the fasteners, lest the entire fastener be so treated. Moreover, the equipment for the induction-heating step is complex and very costly.

The result of all of this trouble and expense is a fastener which has substantially lost the desired ductility and toughness, and in some instances has not achieved the desired hardness. For example, a fastener having a Rockwell $C = 45$ measure of hardness would be too hard and brittle in certain applications where predictable shocks require the fastener to have a certain resilience, ductility and toughness. Yet, the threads of such a fastener even after case hardening and induction treating have collapsed when attempts were made to tap a hole.

The ability to make threaded screw fasteners made of comparatively tough, resilient material possessing threads having stronger, hard characteristics has been long sought, but heretofore has been unavailable.

SUMMARY OF THE DISCLOSURE

This invention relates to an apparatus for making comparatively small metal fastening parts, such as threaded screw fasteners. In practice, these fasteners are made of comparatively tough, ductile material, and are characterized by a comparatively hard substance impregnated at selected points of wear on the thread crests. This impregnated thread structure is particularly useful in the case of self-tapping fasteners having surface locking arrangements, and for high strength fasteners normally formed of materials which are adversely affected by conventional hardening methods. The threads may be impregnated advantageously during the thread-rolling process wherein the threads are rolled on the cylindrical blanks.

One aspect of the invention involves the electrode impregnation of the screw threads or other metal parts as part of the machining process. Unlike other coating processes which require a high degree of cleanliness, the carbide impregnation coating process can tolerate coolant and lubricating fluid and machining grit, and thus can be incorporated into manufacturing metal-working processes with little extra expense.

BRIEF DESCRIPTION OF THE DRAWINGS

FIG. 4 illustrates an elevational view of the invention as shown in FIG. 3;

FIG. 5 illustrates a perspective view of a thread-roll machine application of the invention;

FIG. 6 illustrates a plan view of an alternative thread-roll machine application of the invention;

FIG. 7 illustrates a side elevational view of an alternative embodiment of the invention in use;

FIG. 8 is a cross-sectional view taken along line 8—8 of FIG. 6;

FIG. 9 is a fragmentary perspective view of yet another alternative embodiment of the invention; and FIG. 10 is a side elevational view taken along line 10—10 of FIG. 9.

DESCRIPTION OF THE PRFERRED EMBODIMENT

Figure 1:
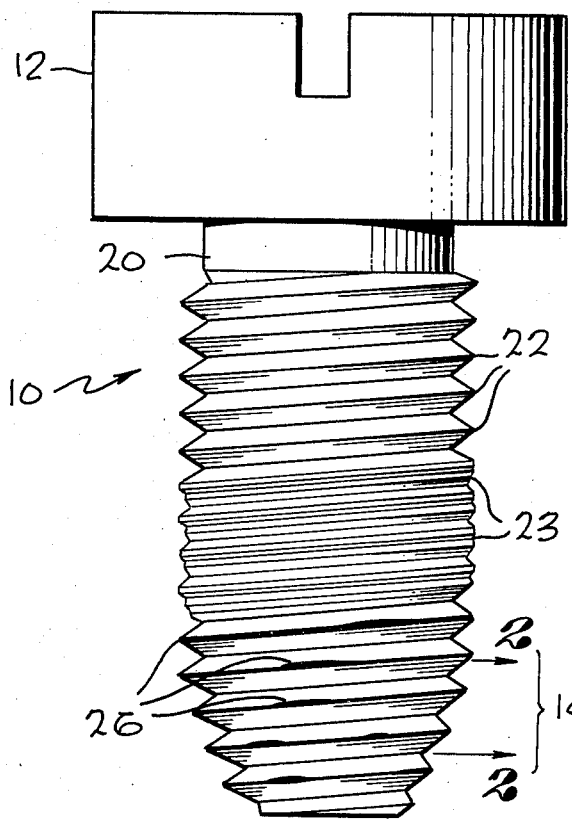
FIG. 1 illustrates a side elevational view of an alternative embodiment of the invention, showing a threaded screw fastener.
Figure 2:
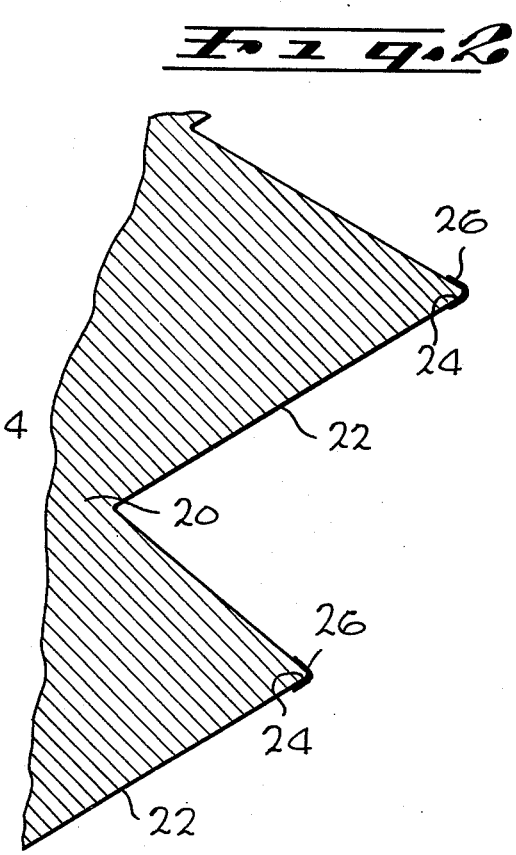
FIG. 2 illustrates a cross-sectional view taken along line 2—2 pf FIG. 1.

To satisfy these aforementioned seemingly contradictory needs in a single fastener, a new fastener construction is shown, reference being had to FIG. 1 in the drawings. As a representative example of possible applications, a screw-type fastener 10 having a head or driving means 12 and conventional pilot end 14, described in more detail below, is shown. The fastener 10 has a shank 20 with a helical screw thread 22 wound thereabout. The shank 20, head 12, pilot end 14 and substantially the thread 22 are made from a relatively ductile, possibly resilient material which is ductile and tough enough to stand up to the stresses under which the fastener could be foreseeably placed. The pilot end 14 of thread 22 is shown in enlarged cross section and more detail in FIG. 2.

The thread 22 has impregnated on its outside edge or crest 24 a small layer 26 of metal, or other relatively hard-type substance such as, for example, tungsten carbide or titanium carbide. Such substances are to be substantially harder than the ductile material used in making the shank 20 and other parts of the fastener 10. A preferred construction is to impregnate only the crest 24 of the initial turns of the thread 22, or pilot end 14 of the fastener 10. When the fastener 10 is introduced to the non-threaded or poorly grooved nut or hole, the hardened crest 24 at the pilot end 14 will form a correctly spaced reciprocal groove or thread therein. The following non-treated shank portion of the thread 22 will then fit within the grooved reciprocal mating thread of the nut formed by the "self-tapping" pilot end 14 so treated. No undue vertical stress will be placed on the base or root of the thread 22 where it joins the shank 20 in such a construction.

By the term "self-tapping," a fastener pilot end both of the thread-forming and of the thread-cutting types is meant. A thread-forming fastener, as the name implies, deforms or reforms the material into which it is driven, forcing the material to conform to the threads of the fastener. In general, the hole for thread-forming fasteners should be sized to produce approximately 80% thread engagement. This value can vary, however, with the flexibility of the material used. Thread-cutting fasteners, on the other hand are manufactured to function as a tap to cut threads into the material being joined. Usually, as the thread-cutting fastener cuts into the material, chips are generated and pushed ahead of the fastener. See, for example, "Solutions to Plastic Fastening Problems" in *Assembly Engineering*, Sept. 1971.

Such an impregnated construction is especially useful when employed in combination with the recently developed self-locking, ribbed screw thread 23 developed by Roger W. Orlomoski and adequately described in U.S. Pat. No. 3,517,717 and in co-pending patent application Ser. No. 284,006 filed Aug. 28, 1972. The thread in such a screw, designated as an ORLO thread or fastener in the trade, is constructed having a rib or split, dual, resiliently tough crests, one of which protrudes outside the boundary of a normal thread cross section. A cross-sectional view of this ORLO-type thread crest is shown in the referenced patent and application. The two crests of such an ORLO thread 23 are pressed together when inserted into a conventional reciprocal, mating thread groove in a nut or hole. A very superior grip is maintained by the outward resilient tension exerted by the dual crested ORLO thread 23. Naturally, it can be seen that a relatively ductile, tough and non-brittle substance is required for the success of such a fastener. Moreover a precise, correctly formed mating thread in the nut or hole is greatly desired. Otherwise, the multi-crested thread will likely collapse within the non-tapped nut.

A fastener having its thread 22 impregnated at the pilot end 14 of the shank 20 as described herein will self-tap a nut or hole in such a case. The ORLO thread 23 portion formed beyond the pilot end 14 and beyond the impregnated crest portion will fit within the thus self-tapped nut or hole grooves and provide the desired fastening.

Self-drilling fasteners, not shown, frequently have their pilot ends notched or grooved in the longitudinal or, if the fastener shank is upright, vertical direction. The vertical groove presents a vertical edge in a hole which, when the fastener is forcefully rotated, forms or cuts the hole and mating threads therein. Such vertical grooves, in the past, necessarily had to be of material harder than the hole which was being formed or cut. It has been found, however, that impregnation of this groove's edges provides sufficient hardness to the cutting edges to form or cut the hole itself and the mating threads in the hole. Such a satisfactory hole is cut despite the fact that the main body of the fastener is made of a tough, ductile material which may even be softer than the material of the hole being cut.

Other resilient surface locking arrangements have also been proposed in the fastener industry. For example, one such arrangement involves the regular displacement of a portion of the entire peak of each of several thread sections of a fastener. The impregnation of hardening material on these variations avoids the need for surface hardening by heat treatment or case hardening, and the resultant degradation and embrittlement of any of the types of locking structures used on self-tapping screws.

It has been found that the resultant fasteners possess a hardness at the impregnated crest 22 comparable to a metal having a hardness $C = 70$, or more, on the above-described Rockwell scale. A fastener having its thread so impregnated, it has been found, does not require case hardening nor induction heat treating to possess the required self-tapping capability. Elimination of these steps allows the use of substantially cheaper metal in making the fastener. By eliminating the case-hardening and induction steps, further, the desired ductility of the fastener is kept. The result is a fastener made from substantially less expensive material having a ductility of approximately $C = 30$, or less, while having self-tapping pilot end threads with a hardness of approximately $C = 70$, or more.

Experiments in impregnating aluminum fasteners indicate that such an impregnation will allow, for the first time, aluminum and other non-ferrous metals and low-carbon steels to be used as self-tapping, cutting-type fasteners.

The method of making such a fastener is substantially less difficult and complex than is the method of preparing the case-hardened and induction-treated fasteners in the presently known methods. The carbide can be deposited upon the fastener's thread crests in any of currently known methods, such as the electric arc vibrating deposition procedure described in detail in U.S. Pat. No. 3,524,956 to I. J. Rocklin. A preferred method of electric, mechanical vibrating deposition, however, is described in detail below in connection with the description of a novel apparatus. A thoroughly cleaned thread is not required for the carbide impregnation. Thus, there is no need to remove the lubricating oil used for the thread rolling, nor to remove the grit of manufacture found in the thread-rolling process. The voltage and impact force of the electrode during operation are sufficient to impregnate the blank through the oils and grit.

The temperature of the fastener remains substantially the same, and therefore the ductility is not changed. The fastener may then be heat treated for neutral hardness, increasing the strength. Such a heat treatment up to approximately 1850°F will not affect the carbide impregnation. See *Tungsten*, 3rd Ed. (1955) by Li and Wang (American Chemical Society Monograph No. 94), at page 390. It has been found that in the electric arc impregnation, some of the thread crest is removed, but that the deposited carbide substantially compensates therefor. It has been found that the carbide so impregnated anchors into the thread crest or other parts of the fastener approximately 0.001 inch, and forms an additional build-up of approximately from 0.001 inch to 0.0015 inch. The impregnation is solidly implanted upon and into the fastener, and is highly resistant to impact and breaking, it has been found.

It is not necessary to deposit the carbide smoothly or evenly upon the thread crest. Indeed, it is preferred that the impregnation be uneven, resulting in a saw-tooth-type configuration upon the crest 24. Such an irregular application is representatively shown in FIGS. 1 and 2 where the impregnated substance 26 of one thread is shown to be somewhat thicker than of the other thread. If the fastener is contemplated as a permanent only one-time inserted fastening arrangement, it should be necessary only to impregnate a selected number of points or zones on the initial, pilot end turns of the thread.

It can be seen that such a treated fastener provides a harder and sharper thread crest for functional forming and cutting, yet is not brittle and consequently not susceptible to chipping in shipping and use.

Figure 3:
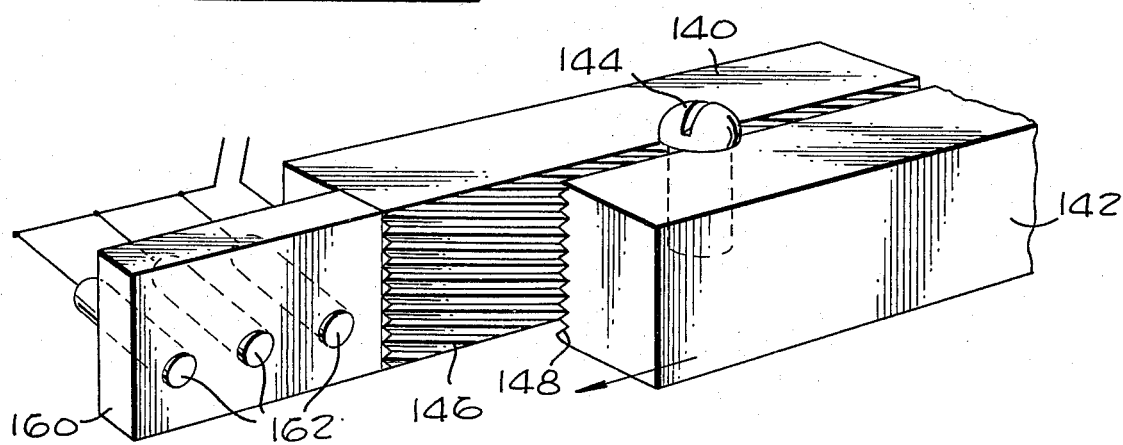
FIG. 3 illustrates a plan or top view of an embodiment of the invention.

The impregnation of the carbide or other relatively harder substance onto the fastener can be performed by an apparatus such as is shown in FIGS. 3 and 4 of the accompanying drawings. In particular, electrode 110 having a face 111 is described mounted on block 112. Such an electrode 110 deposits or impregnates approximately 0.001 inch of tungsten carbide or other similar material into a metal surface, and leaves approximately a 0.001 inch layer of the carbide protruding from the surface in addition.

Block 112 preferably is capable of horizontally swiveling or turning in both the clockwise and the counter-clockwise directions, as indicated in FIG. 3 by the bi-directional arrow 114. Preferably, block 112 swivels about a point approximately at the intersection of the fastener path 128 and the center line, as seen in FIG. 3. The electrode 110 is mounted within a guide block 118 guiding fasteners 120 alongside the electrode 110. The fasteners 120 are the fasteners to be impregnated on their crests, as described in detail above. Mechanical vibrating means, not shown in detail, are shown symbolically in FIG. 3. Such vibrating means, several of which are known in the art, should be capable of mechanically oscillating the electrode 110 at least 9,000 vibrations per minute into, and out of contact with the adjacent fastener 120.

Fasteners 120 are placed in electrode deposition contact with electrode 110 by cable or band 122. Preferably, cable 122 is elastic in nature, so that cable 122 frictionally engages each fastener 120 as it is fed into contact with cable 122.

Cable 122, as shown in FIG. 3, is mounted around pulley 123 and pulley 127. Pulley 123 is mounted to a suitable rotary driving means, such as a motor 121 or the like, shown only representatively and not in detail in the drawings.

Preferably, fasteners are fed into a suitable spacing device such as wheel 124 having cogs 125. Each cog 125 engages a fastener 120 from a fastener supply 126 at spaced intervals. The fasteners 120, therefore, will be fed to cable 122 a distance from each other fastener, the distance being that circumferential distance between the cogs 125. The cable 122 frictionally moves the fastener 120 along a predetermined path 128, alongside electrode 110, and into a receiving container not shown.

As the fastener is moved along the path 128, the friction of cable 122 causes the fastener 120 to rotate about the axis of its shank. The electrode 110 comes into contact with the crest of the threads of the fastener 120, as shown more clearly in FIG. 4 of the accompanying drawings.

The width of electrode 110, or the length along path 128 during which electrode 110 comes into contact with the threads of the fasteners 120 should be adjusted so that the impregnation of the threads of fastener 120 occurs only during one complete revolution of the fastener 120. The electrode can be covered by a suitable material along such a portion of the face 111 so as to achieve the desired electrode face length.

Optionally, but not necessary to the concept of this apparatus invention, a block 130 can be positioned opposite the path 128 from the face 111 of electrode 110. Guiding block or guide 130 may be mounted on rails 132 for movement along the rails in the direction of bi-directional arrow 134. The guide 130 can be adjusted so as to provide a width for path 128 that is only very slightly wider than the diameter of the fastener 120 being impregnated in such a manner. Such a positioning provides two desired results. The fastener driving head, having a diameter larger than the outside diameter of the fastener shank, rests upon the guide 130 and assures impregnation of the desired threads a predetermined distance from the top of the guide 130. Also, the forceful impregnation by electrode 110 can be made with consistent, reliable force against the threads of fastener 120. Otherwise, the fasteners 120 would merely retract against the elastic cable 122 upon impregnating impact by electrode 110, thus partially avoiding the full impact of the impregnating electrode 110.

In certain previously known methods of vibration deposition or impregnation, an impregnating electrode is mechanicaly vibrated into, and out of contact with the workpiece to be impregnated. In such methods, an electric current is established from an electrode in which a very high voltage is maintained, through the workpiece at the point of mechanical contact. The high voltage is probably on the order of 1,000 volts. As the electrode is removed from the workpiece, this high voltage causes current to continue flowing as an arc discharge between the electrode and the workpiece. In the particular thread crest applications here discussed, depositing material in this manner creates an uneven and unpredictable impregnation pattern. While an uneven, saw-tooth like impregnation surface pattern is desirable as discussed above, it is to be preferred to have such a surface pattern consistently and uniformly formed along the crests.

It has been found that the desired consistency of impregnated surface pattern can be achieved where the voltage in the electrode is maintained at a substantially low value, preferably less than 50 volts. A preferred range has been found at about from 5 volts to about 20 volts. In actual practice, such a voltage has produced an electric current flow of approximately less than 50 amperes from the electrode 110 into the workpiece such as the fastener 120. It is believed that the impregnated surface pattern resulting from such an apparatus is uniform because the current flow into the workpiece 120 is achieved only during the momentary mechanical contact. No electric current flow continues as through an arc discharge after physical contact during the retracting portion of the electrode mechanical vibration or oscillation cycle, because of the relatively low voltage, it is believed. Moreover, reliability and consistency of impregnation is achieved by the precise positioning of the workpiece 120 in engaging relationship with the low voltage electrode 110 as afforded by the herein described apparatus invention. The high voltages of certain known devices make an impregnation, but they tend to damage the workpiece by burning, excessive impact or the like.

The electrode 110, optionally, can be pivoted about a horizontal line, so that the electode face 111 can impregnate threads in the conical-shaped shank or pilot end portion of a self-tapping fastener 120. A pilot end in a threaded fastener generally denotes the end of the screw shank opposite the head, or driving end. This end normally has a gradually increasing outside thread diameter beginning from the shank's end. The inside, or root diameter of the thread may or may not be tapered in correspondence with the thread's outside diameter in order to have a useful pilot end. The tapering may not have a thread at all in a pilot end, although normally the thread will extend over such tapering. The fastener of FIG. 5 for example, does not have a pilot end.

In actual construction of such a device, it has been found that impregnation with tungsten carbide of one helical turn of the thread crest of a 3/16 inch screw can be accomplished at speeds of 300 screws per minute.

Alternatively, it is contemplated that the impregnation of the carbide or similar substance can be made upon the crest of the fastener thread during the thread-roll step in conventional thread manufacturing machines. In FIG. 5 is shown die block 140 and die block 142, elements in a conventional thread-forming apparatus. Die block 140 is shown as the stationary die. Die block 142 moves in the direction of the arrow. In the conventional and well-known method of manufacturing threaded fasteners, the blank fastener 144 is rolled between the dies 140, 142 as the die 142 is forcefully moved in the direction of the arrow. Threads are formed on the fastener 144 by the work of the reciprocal, mating grooves 146 on the respective working surfaces of the die blocks 140, 142. The facing grooves 146 on these working faces are so matched that when a fastener blank is rolled between the two dies 140, 142, a continuous thread, or a set of parallel continuous threads are formed on the shank of the fastener.

A slightly different thread-roll apparatus arrangement is illustrated in FIG. 6. A stationary die block 150 is shown having grooves 152 on its working face. A reciprocal, moving die block 154 is movably positioned with its working face opposite that of die block 150. Die 154 has grooves 156 so that when a fastener blank 158 is rolled between the dies 150, 154 in the direction of the arrow as shown, a continuous thread, or a set of parallel continuous threads are formed on the blank 158.

The dies 150, 154 differ from the dies 140, 142 in that the dies of FIG. 6 have grooved ridges 152, 156 which meet each other in such a way as to form a threaded point or a pilot end of the fastener 158, in accordance with known techniques. The thread-rolling apparatus illustrated in FIG. 5 does not form such a pilot end.

With a modification of these thread-rolling dies, the carbide or metal can be automatically and effectively impregnated upon the fastener's threads. In each of the apparatuses illustrated in FIGS. 5 and 6, an extension 160 of the stationary die block 150, 140 is shown. This extension 160 has a carbide impregnating electrode of the type described above, as in U.S. Pat. No. 3,524,956.

The extension 160, as well as any non-forming extension as will be described below, should be constructed so as not to damage or deform the newly formed threads of the fastener blank.

A plurality of electrodes 162 may be placed in the extension 160, as is illustrated in FIGS. 5 and 6 in the drawings. As explained in the referenced patent, the electrodes 162 rapidly move into and out of contact with the newly formed thread crests. The electrodes 162 can be strategically positioned so that only the pilot end 14 is impregnated if that is desired. Alternatively, the electrodes 162 can be positioned so that the entire vertical height of the thread along the shank will be impregnated. Also, one continuous electrode 164 could be positioned as illustrated in FIG. 7. The continuous electrode 164 would effectively impregnate the entire circumference of the fastener's thread crest during thread roll, as explained above.

This new thread-roll apparatus could be constructed wherein the moving die 142, 154 could actuate the electrodes 162 at a predetermined moment when the fastener blank 144, 158 reaches the extension 160. A pressure switch 170, as shown in FIG. 6, a lever, a radiation sensor or any other well-known electric circuit actuating device could be positioned to cause electrodes 162 to activate at the desired moment and for the desired time period.

It has been found that impregnating the pilot or tapping end of the fastener approximately every 120° provides suitable self-tapping capabilities. Thus, three electrodes are shown in FIGS. 5 and 6. These electrodes 162 are carefully positioned so that the fasteners 144, 158 will be rolled past them at the precise distance along the circumference of the fastener on which it is desired to have the intermittent impregnation. By way of illustration, the distance between the electrodes 162 in FIG. 5 will be exactly 120° of the circumference of the outside diameter of the threads on fastener 144.

The electrodes 162 may be energized by the moving die 142, 154 so that they will operate only when the fastener 144, 158 approaches the extension 160, and the grooves 148, 156 of the reciprocal moving die have moved beyond them. There will, of course, have to be added to the moving die 142, 154 an extension 168 shown here only in FIG. 6. Such an extension 168 will not have grooved ridges and will serve only to continue rolling the fastener past the electrodes 162, 164 after the conventional thread-rolling step has been completed.

If a pilot end is made on the fastener, such as fastener 158 shown in phantom in FIG. 8, the electrodes 162 should have a canted electrode tip. Such a canted electrode tip should fit complementally against the taper of the diminishing outside diameter of the thread on the pilot end of the fastener 158. Such a complementally canted fit is illustrated in FIG. 8. This type of specially formed electrode tip also has particular advantages when used to impregnate the hole-forming edges of a vertically grooved, self-tapping fastener. The hole-forming edge is thus completely impregnated along its vertical length.

If a self-tapping, cutting type pilot end is desired, it may prove to be advantageous to impregnate the self-tapping, cutting type tip end of the shank from the lower end of the thread-rolling apparatus as opposed to impregnation from the sides as shown in FIGS. 5 and 6. In FIGS. 9 and 10, for example, a basic scheme for impregnating a thread fastener on its tip end from the bottom is shown. A stationary thread-roll die 180 is shown having an extension 182. A stationary thread-roll die 180 is shown having an extension 182. The extension 182 is adapted to extend only so far down from the neck of the fastener 184 so as to retain the fastener 184 in its travel for a short distance beyond the ordinary, normal thread-roll dies.

A die 186 movable in relation to die 180 is shown having an extension 188 comparable in shape and purpose to extension 182. The die 186 and extension 188 move in the direction of the arrows shown in FIG. 9 when the fastener 184 is being thread-rolled and the threads thereon are being formed.

An impregnating electrode 190 of the description given above is positioned vertically by suitable support means 192. The electrode 190 is electrically connected to the power source, not shown, by connection 194.

Electrode 190 is shown having a slanted tip 196 for engaging a self-tapping, cutting type tip end 198 of a formed fastener 184. Thus, the cutting edges or crests of the tip end 198 of fastener 184 can be impregnated with a hard substance, such as tungsten carbide or titanium carbide during the thread-roll forming process economically, efficiently and at very high speed. When the fastener 184 is rolled in the direction of the arrows in FIG. 9, the extensions 182, 188 cause the fastener 184 to continue being rolled (but not formed) for a short distance beyond the ordinary thread-roll dies 180, 186. A self-tapping tip end 198 of the fastener 184 will then be brought into close proximity to the slanted tip 196 of impregnating electrode 190. The electrode 190 may be actuated by actuating device 200, and be caused to come into rapid and repeated impregnating contact with tip end 198. Actuating device 200 may be a switch or a sensor electrically connected to connection 194 so as to actuate electrode 190 for selected, predetermined periods sufficient to ensure that electrode 190 will be operating when the fastener 184 is rolled in proximity over the electrode 190.

If the tip end 198 of the fastener 184 is horizontally level, the tip 196 of electrode 190 should complementally be horizontally level. Moreover, it should be pointed out that vertical electrodes, as shown in FIGS. 9 and 10, and horizontal or angled electrodes, as shown in FIGS. 5, 6, 7 and 8, may be combined in the same thread-roll machine so that the threads and the tip end of the fastener are impregnated as described. Such dual impregnation could be arranged to occur simultaneously or seriatim, however the fastener manufacturer may desire.

Varied and different designs for impregnating electrodes can be employed which have not been described here in detail. Such additional impregnating electrode designs, while differing in shape should not be considered as departures from the spirit of the appended claims which define the true scope of this invention. For example, an impregnating electrode having a curved face complementally facing a wheel could be designed. Thus, fasteners could be carried on the circumference of a rotating wheel, not shown. The fasteners, if desired, could be rotated as they are moved about the circumference of such a wheel, while the thread crests of the fastener are exposed in impregnating contact to a circumferentially complemental impregnating, curved electrode or series of electrodes. Other impregnating electrode shapes and arrangements may be found adaptable to specific fastener carrying arrangements.

Such impregnated self-tapping, cutting type or self-drilling fastener tip ends 198 are extremely practical when the fastener 184 is made of aluminum alloys or other non-ferrous alloys. The carbide impregnation on the cutting eges of the self-tapping or self-drilling tip end of such alloys, as well as to the tapping threads, allow an aluminum alloy or other non-ferrous metal alloy screw to be used for light guage steel and aluminum sheets.

Reviewing the present invention, it may be noted that a new technique for economically producing high strength fasteners has been developed. The fasteners may be made of tough, inexpensive low carbon steels or of non-ferous metals, and are not subject to the embrittlement or other adverse effects of conventional heat treatments for surface hardening. The hardening impregnation may be placed on two, three or more zones on the lead threads of the self-tapping screws, thus providing self-tapping capabilities without impairing the basic toughness of the body of the fastener, or the resiliency or yield point of resilient locking features of the threads of fasteners.

I claim:

1. In an apparatus for producing self-tapping threaded fasteners from metallic fasteners which have been formed with complete helical, crested threads upon a shank, means for hardening at least portions of the threads of said fastener, said hardening means comprising:

at least one electrode of carbon-containing material in a predetermined fixed position;

means for advancing said threaded fastener in rolling motion along a predetermined path past said electrode to successively position portions of the crest region of its completely formed thread adjacent said electrode;

means for maintaining said electrode in contact with said thread crest portions as said fastener is rolled along said predetermined path for hardening said thread portions around the periphery of said fastener; and means for applying a potential difference between said threaded fastener and said electrode.

2. An apparatus as claimed in claim 1, comprising means for vibrating said electrode without changing its predetermined fixed position.

3. An apparatus as claimed in claim 1, wherein the carbon-containing material is selected from the group consisting of tungsten carbide and titanium carbide.

4. An apparatus as claimed in claim 1, comprising a plurality of elctrodes disposed along said predetermined path.

5. An apparatus as claimed in claim 1, wherein said means for advancing said threaded fastener comprises a conveying assembly for imparting said rolling motion to successive fasteners as they are advanced past said electrode.

6. An apparatus as claimed in claim 5, said conveying assembly comprising a motor-driven endless belt for frictionally engaging said fasteners.

7. An apparatus as claimed in claim 5, said conveying assembly comprising at least one guide for supporting each said fastener as it is advanced past said electrode in rolling motion.

8. An apparatus as claimed in claim 5, said conveying assembly comprising means for feeding said threaded fasteners one after the other and at a substantially constant rate into said predetermined path.

* * * * *

UNITED STATES PATENT OFFICE
CERTIFICATE OF CORRECTION

PATENT NO. : 3,968,533
DATED : July 13, 1976
INVENTOR(S) : Richard L. Reynolds

It is certified that error appears in the above-identified patent and that said Letters Patent are hereby corrected as shown below:

Please amend the Assignee from "Litton Fastening Systems" to read as --Litton Systems, Inc.--.

Signed and Sealed this

Twelfth Day of October 1976

[SEAL]

Attest:

RUTH C. MASON
Attesting Officer

C. MARSHALL DANN
Commissioner of Patents and Trademarks